(12) United States Patent
Sullam (10) Patent No.: US 8,112,551 B2
(45) Date of Patent: Feb. 7, 2012

(54) ADDRESSING SCHEME TO ALLOW FLEXIBLE MAPPING OF FUNCTIONS IN A PROGRAMMABLE LOGIC ARRAY

(75) Inventor: Bert Sullam, Bellevue, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 153 days.

(21) Appl. No.: 12/776,324

(22) Filed: May 7, 2010

(65) Prior Publication Data

US 2010/0287334 A1 Nov. 11, 2010

Related U.S. Application Data

(60) Provisional application No. 61/176,291, filed on May 7, 2009.

(51) Int. Cl.
*G06F 13/00* (2006.01)
*G06F 12/02* (2006.01)

(52) U.S. Cl. ..................................... 710/3; 710/8; 710/9
(58) Field of Classification Search ........................ None
See application file for complete search history.

(56) References Cited

U.S. PATENT DOCUMENTS

| 5,168,562 | A  | * | 12/1992 | Estepp et al. | 710/16 |
| 6,457,114 | B1 | * | 9/2002  | Paluch | 711/219 |
| 2008/0270828 | A1 | * | 10/2008 | Wienchol | 714/12 |
| 2008/0288715 | A1 | * | 11/2008 | Maddali et al. | 711/103 |

* cited by examiner

*Primary Examiner* — Ilwoo Park (57) ABSTRACT

A programmable processing device comprises a plurality of universal digital blocks (UDBs) in a UDB linear array. Each register in each UDB is associated with a plurality of memory addresses, where each memory address is from each of the different memory address spaces associated with different access mode widths of different digital peripheral functions. A digital peripheral function of an access mode width is mapped to one or more contiguous UDBs starting with a first UDB in the UDB linear array. Based on the access mode width, one of the associated memory addresses is chosen for the first UDB.

20 Claims, 10 Drawing Sheets

TABLE 301

| UDB # | 0 | 1 | 2 | 3 | ... | 14 | 15 |
|---|---|---|---|---|---|---|---|
| | 0 | 1 | 2 | 3 | ... | 14 | 15 |
| | 16 | 17 | 18 | 19 | ... | 30 | 31 |
| ... | ... | ... | ... | ... | ... | ... | ... |
| | n x 16 | nx16+1 | nx16+2 | nx16+3 | ... | nx16+14 | nx16+15 |

REGISTER INDEX NUMBER IN EACH UDB: 0, 1, ..., n

FIGURE 3A

TABLE 302

| REGISTER INDEX NUMBER IN EACH UDB | UDB # 0 | 1 | 2 | 3 | ... | 14 | 15 |
|---|---|---|---|---|---|---|---|
| 0 | 0 | 2 | 4 | 6 | ... | 28 | 30 |
| 1 | 32 | 34 | 36 | 38 | ... | 60 | 62 |
| ... | ... | ... | ... | ... | ... | ... | ... |
| n | 2x(nx16) | 2x(nx16+1) | 2x(nx16+2) | 2x(nx16+3) | ... | 2x(nx16+14) | 2x(nx16+15) |

FIGURE 3B

TABLE 303

| REGISTER INDEX NUMBER IN EACH UDB \ UDB # | 0 | 1 | 2 | 3 | ... | 14 | 15 |
|---|---|---|---|---|---|---|---|
| 0 | 0 | 4 | 8 | 12 | ... | 46 | 60 |
| 1 | 64 | 68 | 72 | 76 | ... | 120 | 124 |
| ... | ... | ... | ... | ... | ... | ... | ... |
| n | 4x(nx16) | 4x(nx16+1) | 4x(nx16+2) | 4x(nx16+3) | ... | 4x(nx16+14) | 4x(nx16+15) |

ADDRESSING SCHEME TO ALLOW FLEXIBLE MAPPING OF FUNCTIONS IN A PROGRAMMABLE LOGIC ARRAY

CROSS-REFERENCE TO RELATED APPLICATIONS

This application claims the benefit of U.S. Provisional Patent Application No. 61/176,291, filed on May 7, 2009.

TECHNICAL FIELD

This disclosure relates to a programmable processing device and, more particularly, to an addressing scheme in a programmable processing device.

BACKGROUND

A programmable processing device can be programmed to handle dozens of data acquisition channels and analog or digital inputs. A programmable processing device typically includes a central processing unit (CPU) and several programmable digital blocks organized as a linear array. The digital peripheral functions of varying length can be mapped to one or more the programmable digital blocks.

Each programmable digital block in a linear array of blocks is assigned with either an even or odd memory address. If the width of the programmable digital block is the same as the width of the digital peripheral function to be mapped, for example, 8 bits wide, the digital peripheral function can be mapped to any programmable digital block with either even or odd memory address. Accordingly, the width of the mapped digital peripheral function is aligned with the address of the programmable digital block, which makes the CPU to be able to access the mapped digital peripheral function in one cycle via a system bus.

However, when the width of the digital peripheral function to be mapped is wider than the width of the programmable digital block, for example, the digital peripheral function is 16 bits wide and the programmable digital block is 8 bits wide, two programmable digital blocks are required to map the function. There are two ways the digital peripheral function can be mapped into the linear array programmable digital block: 1) map the digital peripheral function to one or more programmable digital blocks starting with a programmable digital block having an even memory address; or 2) map the digital peripheral function to one or more programmable digital blocks starting with a programmable digital block having an odd memory address. The first way of mapping has the advantage that the CPU will be able to access the mapped function in one cycle, since it is an aligned access, but it will result in wasted resources because it means that a 16-bit function can never be mapped to start with a programmable digital block with an odd memory address. The second way has the advantage that the function can be mapped to start in any block, but it will force the CPU to break up the access to the mapped digital peripheral function into multiple access cycles at aligned boundaries, which complicates the interaction between the peripheral and the CPU.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific system components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present disclosure.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Embodiments of a method and an apparatus are described for a programmable processing device having a plurality of programmable digital blocks (PDBs) in a PDB array, where each PDB has a unique PDB number and comprises same number of a plurality of registers. In one embodiment, the PDB array is a linear array. In one embodiment, the PDBs in the PDB array are universal digital blocks (UDBs) in the UDB array. Each register in each UDB of the UDB linear array has a register address. In one embodiment, a digital peripheral function with an access mode of a given width is mapped to one or more contiguous UDBs staffing with a first UDB and the CPU can then access data starting with a first register in the first UDB based on a linear order of the UDB linear array. In one embodiment, one of the associated memory addresses for the first register is chosen based on the width of the access mode of the digital peripheral function. Each of the associated memory addresses resides in each of different memory address spaces associated with different access mode widths. For example, an 8-bit access mode width (function width) uses one address space, and a 16-bit access mode width will use a different address space. The chosen memory address in that address space is then a multiple of a ratio between the access mode width of the digital peripheral function and the width of the function.

Figure 1A:
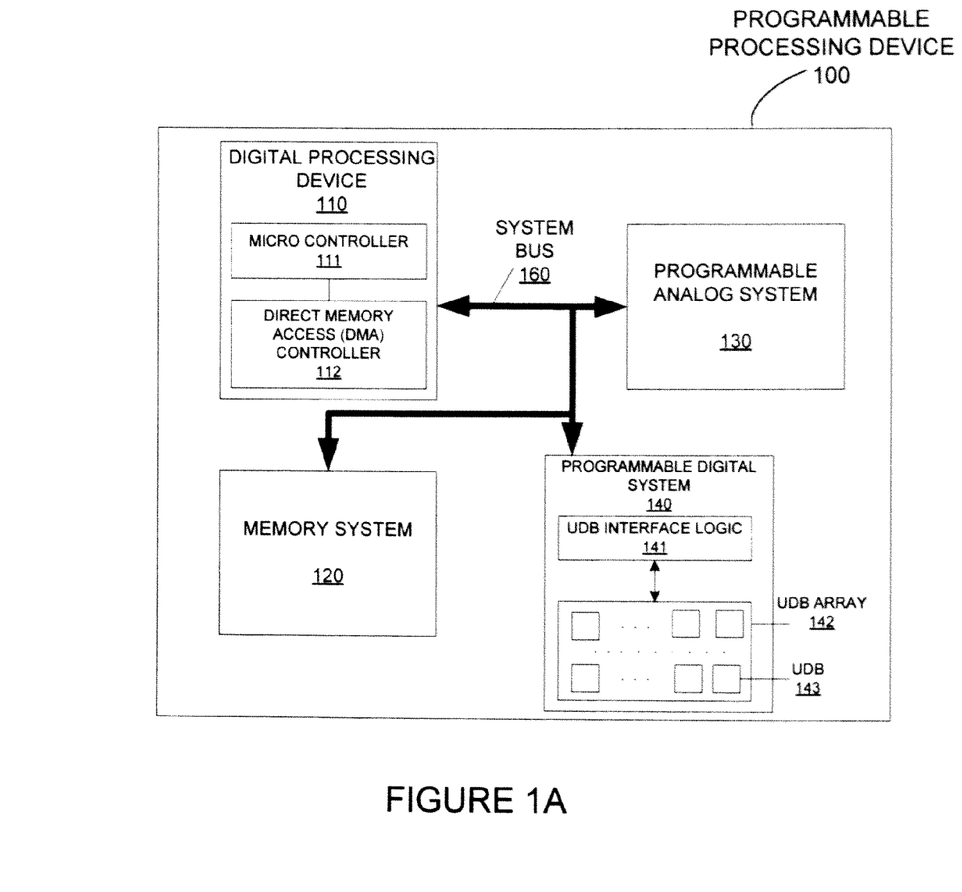
FIG. 1A illustrates a block diagram of one embodiment of a programmable processing device.

FIG. 1A illustrates a block diagram of one embodiment of a programmable processing device 100. The programmable processing device 100 includes a digital processing device 110, a memory system 120, a programmable analog system 130, and a programmable digital system 140. The digital processing device 110 described herein may include one or more general-purpose processing devices such as a microprocessor or central processing unit, a microcontroller, or the like. Alternatively, the digital processing device 110 may include one or more special-purpose processing devices such as a digital signal processor (DSP), an application specific integrated circuit (ASIC), a field programmable gate array (FPGA), or the like. In an alternative embodiment, for example, the digital processing device 110 may be a network processor having multiple processors including a core unit and multiple microengines. Additionally, the digital processing device 110 may include any combination of general-purpose processing devices and special-purpose processing devices.

In one embodiment, the digital processing device 110 comprises a micro controller 111 and a DMA controller 112. The micro controller 111 and the DMA controller 112 work dependent with each other. Alternatively, the micro controller 111 and the DMA controller 112 may work independent of each other. In one embodiment, the DMA controller 112 is responsible for the data transfers between the peripherals of the programmable processing device 100. In one embodiment, both the micro controller 111 and the DMA controller 112, being the system bus masters, may initiate data transactions on the system bus 160. In one embodiment, the DMA controller 112 can handle peripheral communication without the intervention from the micro controller 111. In one embodiment, the DMA controller 112 may receive signals from or send signals to system resources located in the memory system 120, the programmable analog system 130, or the programmable digital system 140.

In one embodiment, the programmable analog system 130 provides unique analog configurability and may be configured to correspond to the specific analog functions desired by a user. In another embodiment, the programmable digital system 140 provides unique digital configurability and may be configured to correspond to the specific digital peripheral functions desired by a user. In one embodiment, a user can use a configuration software program to configure or program the programmable digital system 140 with chosen configuration data during the initialization phase of the programmable processing device 100 so that the programmable processing device 100 can deliver the user desired functionality. In one embodiment, a user can also use the configuration software program to choose the digital peripheral devices to be used with the programmable processing device 100.

Each chosen digital peripheral device is configured to perform certain digital peripheral functions. In one embodiment, the width of the digital peripheral function is measured by a width of an access mode. In one embodiment, the width of the access mode of a digital peripheral function is 8 bits. In another embodiment, the width of the access mode of a digital peripheral function is 16 bits. In yet another embodiment, the width of the access mode of a digital peripheral function is 32 bits. Alternatively, the access mode of a digital peripheral function may have a width other than 8, 16, or 32 bits, as would be appreciated by one of ordinary skill in the art.

After the digital peripheral devices are chosen, the digital processing device 110 of the programmable processing device 100 is configured to map the digital peripheral functions to be performed by the chosen digital peripheral devices to the programmable digital system 140. In one embodiment, the programmable digital system 140 comprises an interface logic 141 and a universal digital block (UDB) array 142 having a plurality of UDBs 143. Alternatively, the UDB array 142 could be any programmable digital block (PDB) array. In one embodiment, the interface logic 141 is a UDB interface logic. Each UDB 143 in the UDB array 142 has a unique UDB number. In one embodiment, the UDB numbers are integers, such as 0, 1, 2, 3 . . . . In one embodiment, the digital processing device 110 is configured to chain the plurality of UDBs 143 into a UDB linear array 142 based on a linear sequence of the UDB numbers associated with the plurality of UDBs 143. In one embodiment, the linear sequence of the UDB numbers in the UDB linear array 142 is in an ascending order.

In one embodiment, the digital processing device 110 is configured to map a digital peripheral function with a certain access mode width to one or more contiguous UDBs in the UDB linear array. The interface logic 141 is configured to couple with each UDB 143 in the UDB linear array 142 and to receive signals from the digital processing device 110 via the system bus 160. In one embodiment, the interface logic 141 determines the width of the access mode of the digital peripheral function to be mapped. In one embodiment, the interface logic 141 sets a flag to indicate which access mode the digital peripheral function has.

In one embodiment, each UDB 143 in the UDB linear array 142 is associated with a plurality of memory addresses, where each of the plurality of memory addresses is chosen from each of the different memory address spaces associated with different access modes of different digital peripheral functions. In one embodiment, the plurality of memory addresses are hardcoded with each UDB. In one embodiment, each of the memory address spaces is separated from each other in a memory map. In one embodiment, based on the flag set by the interface logic 141, the digital processing device 110 is configured to choose one of the hardcoded memory addresses based on the access mode width, so that the digital processing device 110 can access the mapped digital peripheral function using the chosen memory address. In one embodiment, the chosen memory address from a memory address space associated with an access mode width of a digital peripheral function is a multiple of a ratio R, where R is the ratio between the access mode width of the digital peripheral function and the width of the UDB to be mapped.

Figure 1B:
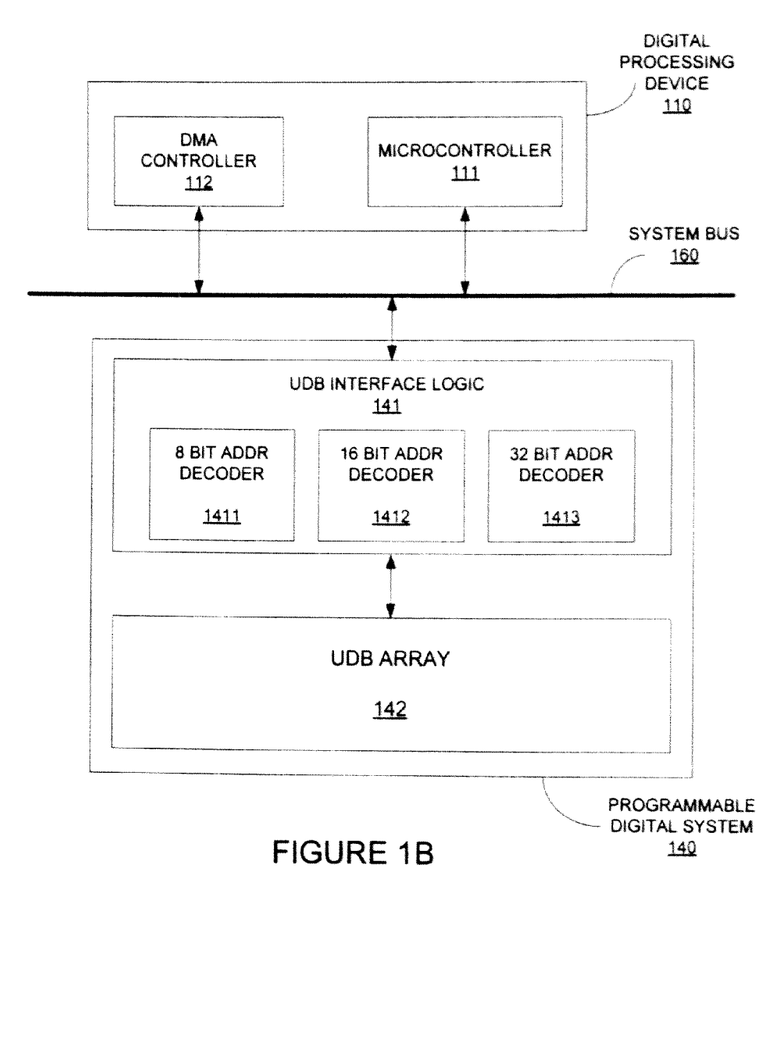
FIG. 1B illustrates one embodiment of an address decoding implementation for digital peripheral functions with different access mode widths.

FIG. 1B illustrates one embodiment of an address decoding implementation for digital peripheral functions with different access mode widths. As shown, the UDB interface logic 141 comprises an 8 bits address decoder 1411, a 16 bits address decoder 1412, and a 32 bits address decoder 1413, each of which detects a given address space. In one embodiment, each of the decoders can set flags to indicate the access mode width requested, and translate the address from the system bus into the addresses as exemplified in Table 301, 302, and 303 shown in FIG. 3A, FIG. 3B, and FIG. 3C, respectively. Each access mode width is mapped to a different address space in the system bus 160 of the programmable processing device. In one embodiment, the UDB register read and write accesses are generated by the microcontroller 111, the DMA controller 112, or other system bus masters. These read and write accesses on the system bus are decoded by the address decoders 1411, 1412, and 1413 in the UDB interface logic 141.

When a user specifies a digital peripheral function of a given access mode width, the software tools running at the programmable processing device 100 can map the digital peripheral function into one or more UDBs in the UDB array 142 to match the access mode width of the digital peripheral function. Once the digital peripheral function is mapped and enabled to operate, the user will read or write the mapped digital peripheral function using registers of the UDBs. For example, if a 16 bits digital peripheral function is mapped to one or more UDBs starting with a first UDB in the UDB array, the mapped digital peripheral function can be accessed via the registers in those UDBs, to which the digital peripheral function is mapped, using the 16 bits address space targeting the address of the first UDB in the UDB array. Due to the aligned accesses, the least significant byte address is used, and the full width of the digital peripheral function is read or written to in one cycle.

In one embodiment, there are two ways a user can decide which address space to use: the manual method and the tool method. In the manual method, if the user knows the access mode width of the mapped digital peripheral function and the software tool reports to which UDBs to which the digital peripheral function is mapped, the user can manually compute the UDB block addresses using an address table. In the tool method, the software tools, used to configure the programmable processing device, know both the access mode width of the mapped digital peripheral function and to which UDBs the digital peripheral function is mapped. As a result, the software tools can provide pre-defined addresses for each type of register access.

Figure 1C:
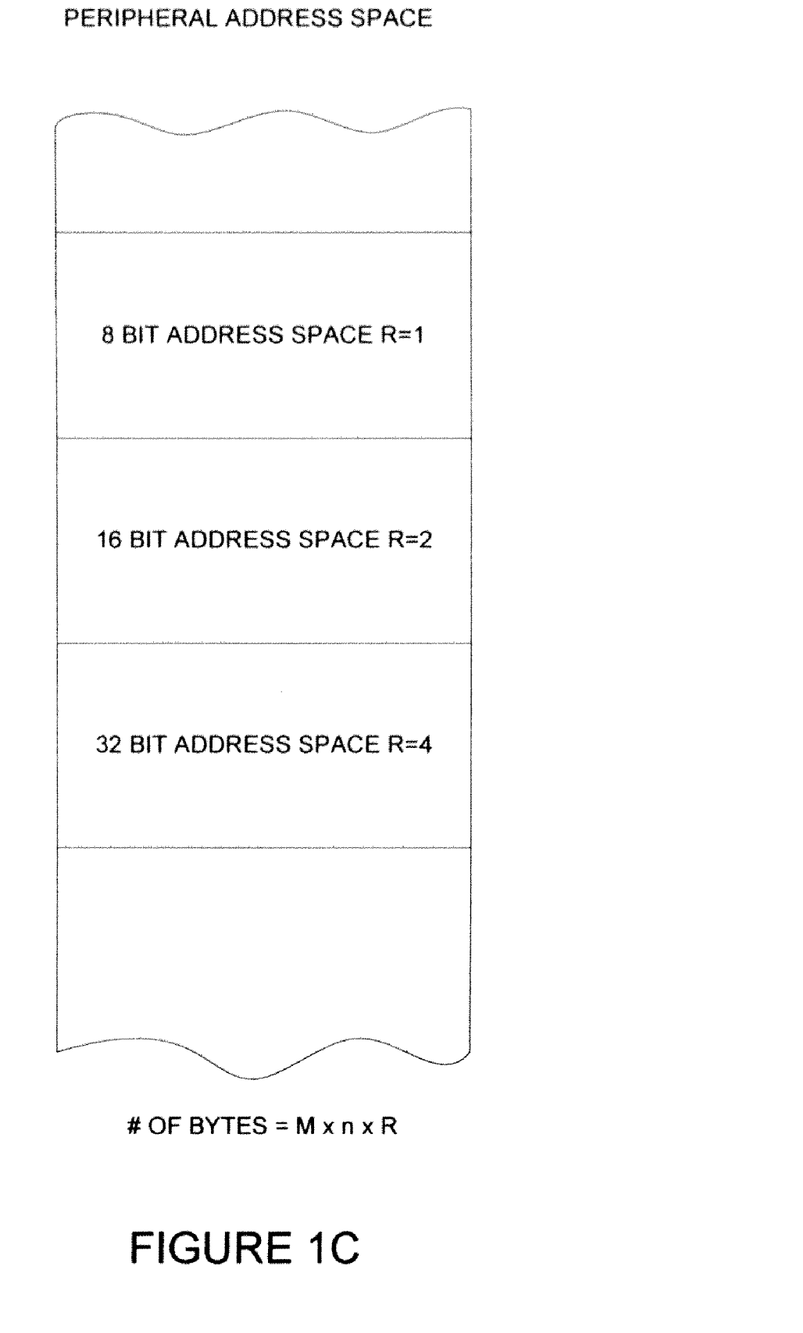
FIG. 1C illustrates one embodiment of a memory map showing three different peripheral address spaces associated with different access mode widths.

FIG. 1C illustrates one embodiment of a memory map showing three different peripheral address spaces associated with different access mode widths. As shown, three address spaces (8 bits, 16 bits, and 32 bits) are mapped as part of the full peripheral access address space of the memory map of the programmable processing device 100. In one embodiment, the number of bytes required for each address space is M×n×R, where M is the number of UDBs in the UDB array, n is the number of registers in each UDB, and R is the ratio of the digital peripheral function access mode width to the UDB width.

Figure 2:
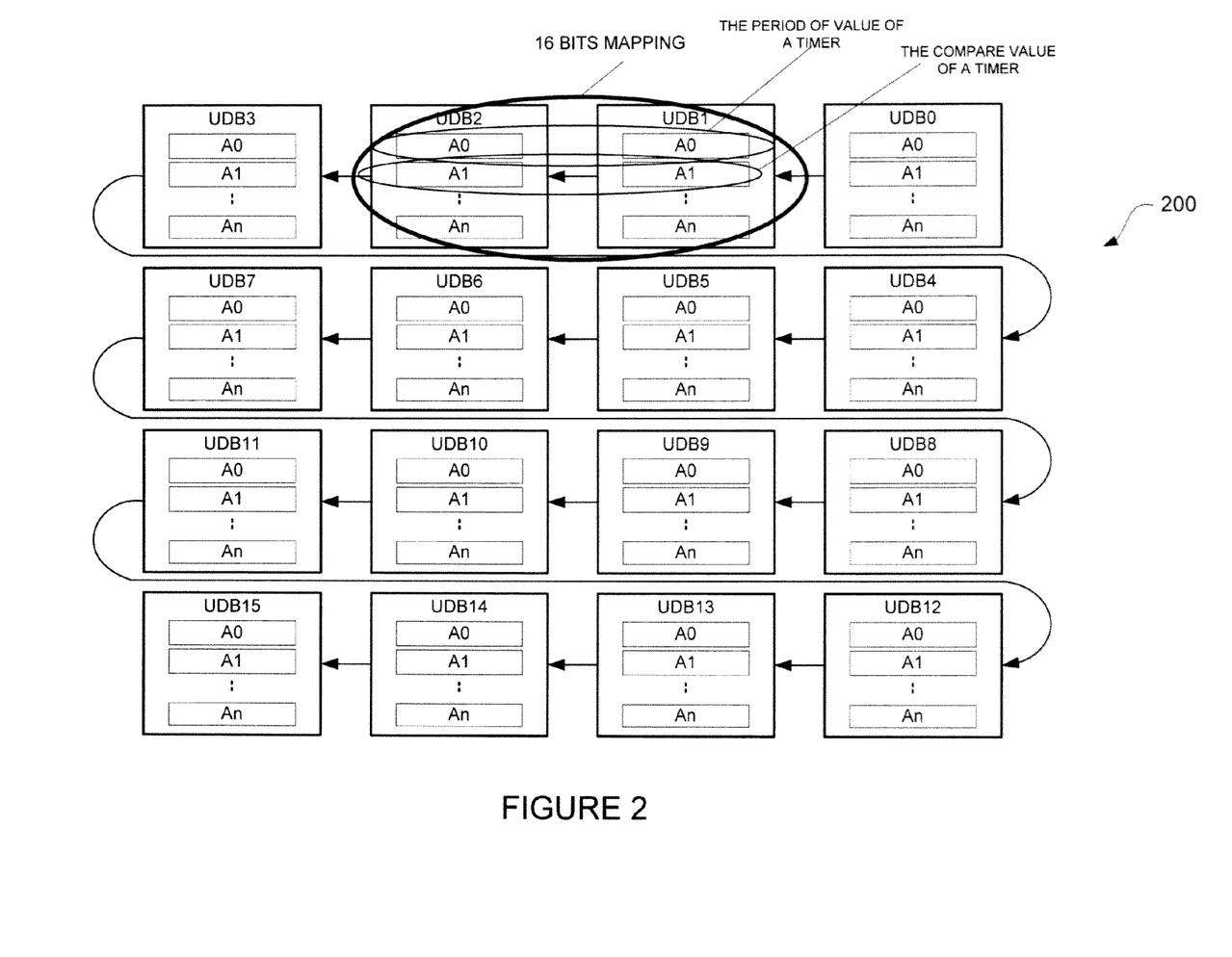
FIG. 2 illustrates one embodiment of a universal digital block (UDB) linear array in a programmable digital system of a programmable process device.

FIG. 2 illustrates one embodiment of a UDB linear array in a programmable digital system of a programmable processing device. As shown, the UDB linear array 200 comprises 16 UDBs. Each UDB in the UDB linear array 200 is associated with a UDB number, i.e., 0, 1, 2, . . . , 15. In one embodiment, each UDB is chained into the UDB linear array 200 based on an ascending sequence of the UDB numbers associated with the UDBs. As shown by the arrows, the order of the UDB linear array 200 starts with UDB0 and ends with UDB15. As shown, UDB 1 is adjacent to UDB 0 and is subsequent in order to UDB0 in the UDB linear array 200, UDB2 is adjacent to UDB1 and is subsequent in order to UDB1 in the UDB linear array, and etc.

In one embodiment, when the access mode width of a digital function to be mapped is wider than the UDB width in the UDB linear array, the portion of the access mode width that exceeds the width of the UDB is mapped to an adjacent UDB that is subsequent in order in the UDB linear array. In one embodiment, when the access mode width of a digital peripheral function is 16 bits, the low byte of the 16 bits of the digital peripheral function is mapped to UDB1 and the high byte of the 16 bits of the digital peripheral function is mapped to UDB2.

In one embodiment, each UDB in the UDB linear array 200 comprises the same number of a plurality of registers A0, A1, . . . , An, where 0, 1, . . . n represents register index numbers in each UDB of the UDB linear array. Different variables of a digital peripheral function can be mapped to different registers in each UDB, respectively. For example, if a 16 bits wide timer function with two variables is mapped to the UDB1 and UDB2, the variable of the period of value of the timer function may be mapped to the two registers A0 in UDB 1 and UDB2, and the variable of the compare value of the timer function may be mapped to the two registers A0 in UDB 1 and UDB2.

Figure 3A:
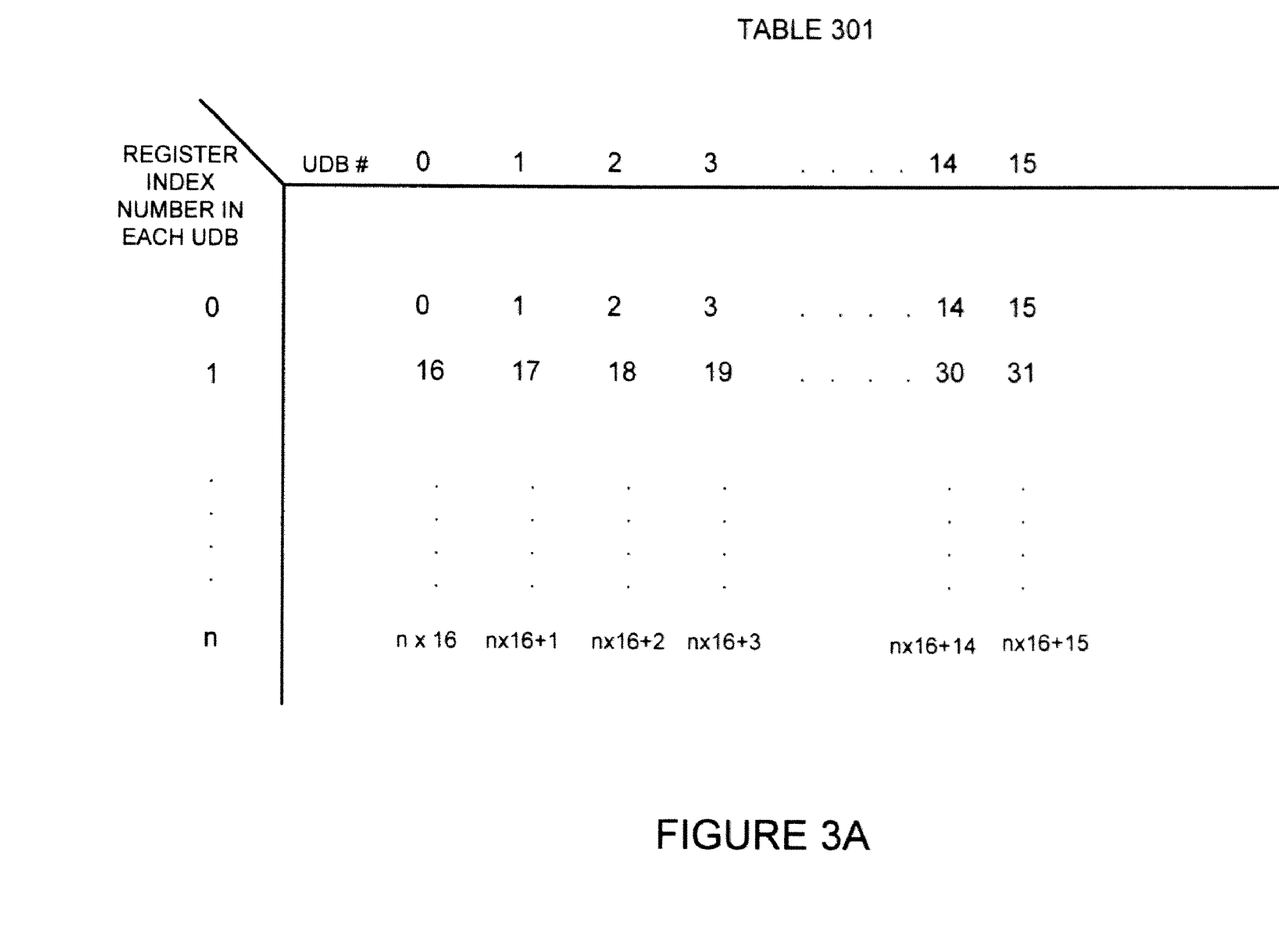
FIG. 3A illustrates a Table 301 showing one embodiment of a memory address space associated with an 8 bits access mode of a digital peripheral function for all registers in each UDB of a UDB linear array.

FIG. 3A illustrates a Table 301 showing one embodiment of a memory address space associated with an 8 bits access mode of a digital peripheral function for all registers in each UDB of a UDB linear array. In this embodiment, the UDB linear array comprises 16 UDBs with each UDB having (n+1) registers A0, A1, . . . , An, where 0, 1, . . . n represent the register index numbers of the registers in each UDB. Each UDB has an integer UDB number, starting with 0 and ending with 15. The memory addresses in the memory address space comprise R×((register index number×number of UDBs in the UDB linear array)+UDB number), where R is the ratio between the width of the access mode of the digital peripheral function and the width of each UDB in the UDB linear array. In one embodiment, each UDB in the UDB linear array is 8 bits wide. According, R=8 bits of access mode/8 bits of UDB width=1. Thus, each memory address in the memory address space in Table 301 can be calculated by 1×((register index number×number of UDBs in the UDB linear array)+UDB number). For example, the corresponding memory address for the register A1 in UDB 2 is 1×(1×16+2)=18.

Figure 3B:
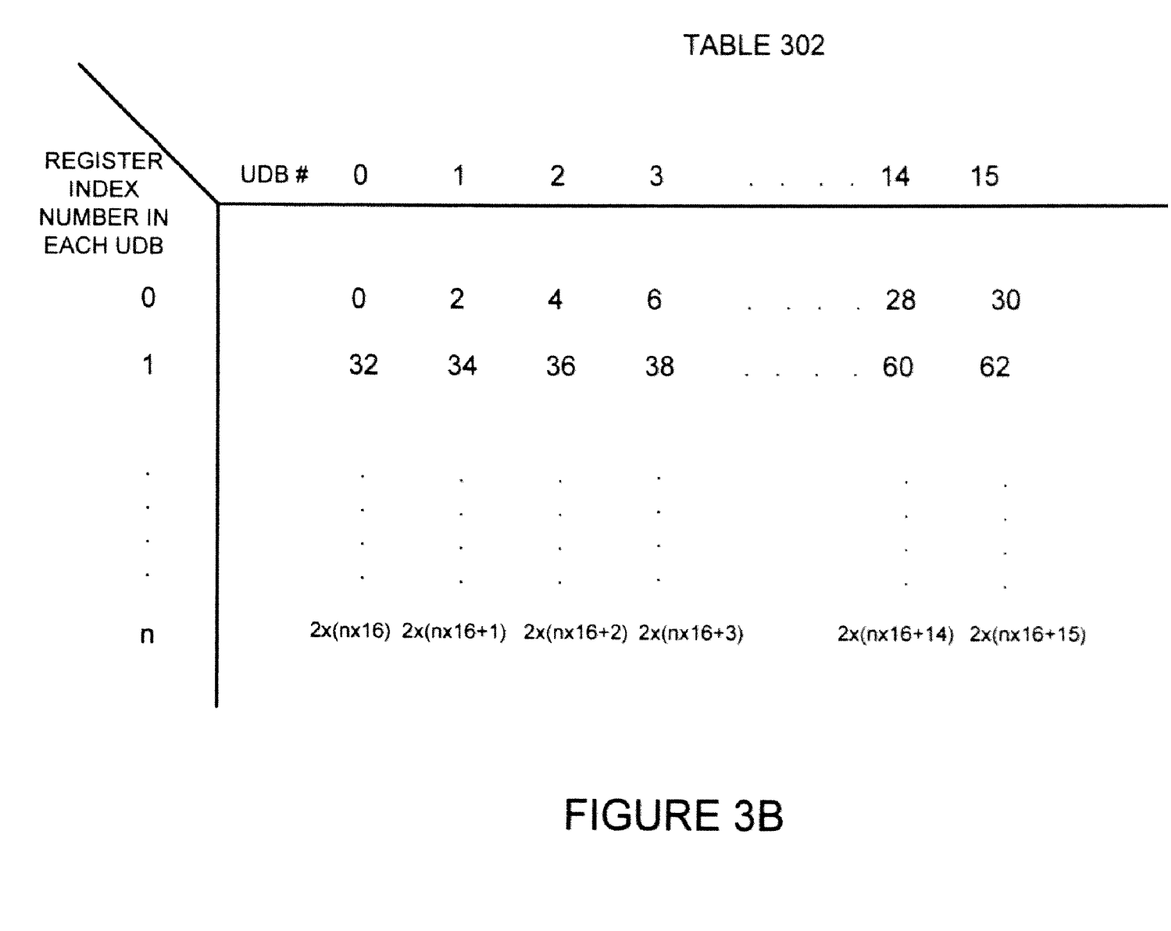
FIG. 3B illustrates a Table 302 showing one embodiment of a memory address space associated with a 16 bits access mode of a digital peripheral function for all registers in each UDB of a UDB linear array.

FIG. 3B illustrates a Table 302 showing one embodiment of a memory address space associated with a 16 bits access mode of a digital peripheral function for all registers in each UDB of a UDB linear array. In this embodiment, the UDB linear array comprises 16 UDBs with each UDB having (n+1) registers A0, A1, . . . An, where 0, 1, . . . n represent the register index numbers in each UDB. Each UDB has an integer UDB number, starting with 0 and ending with 15. The memory addresses in the memory address space comprise R×((register index number×number of UDBs in the UDB linear array)+UDB number), where R is the ratio between the width of the access mode of the digital peripheral function and the width of each UDB in the UDB linear array. In one embodiment, each UDB in the UDB linear array is 8 bits wide. According, R=16 bits of access mode/8 bits of UDB width=2. Thus, each memory address in the memory address space in Table 302 can be calculated by 2×((register index number×number of UDBs in the UDB linear array)+UDB number). For example, the corresponding memory address for the register A0 in UDB 3 is 2×(0×16+3)=6.

Figure 3C:
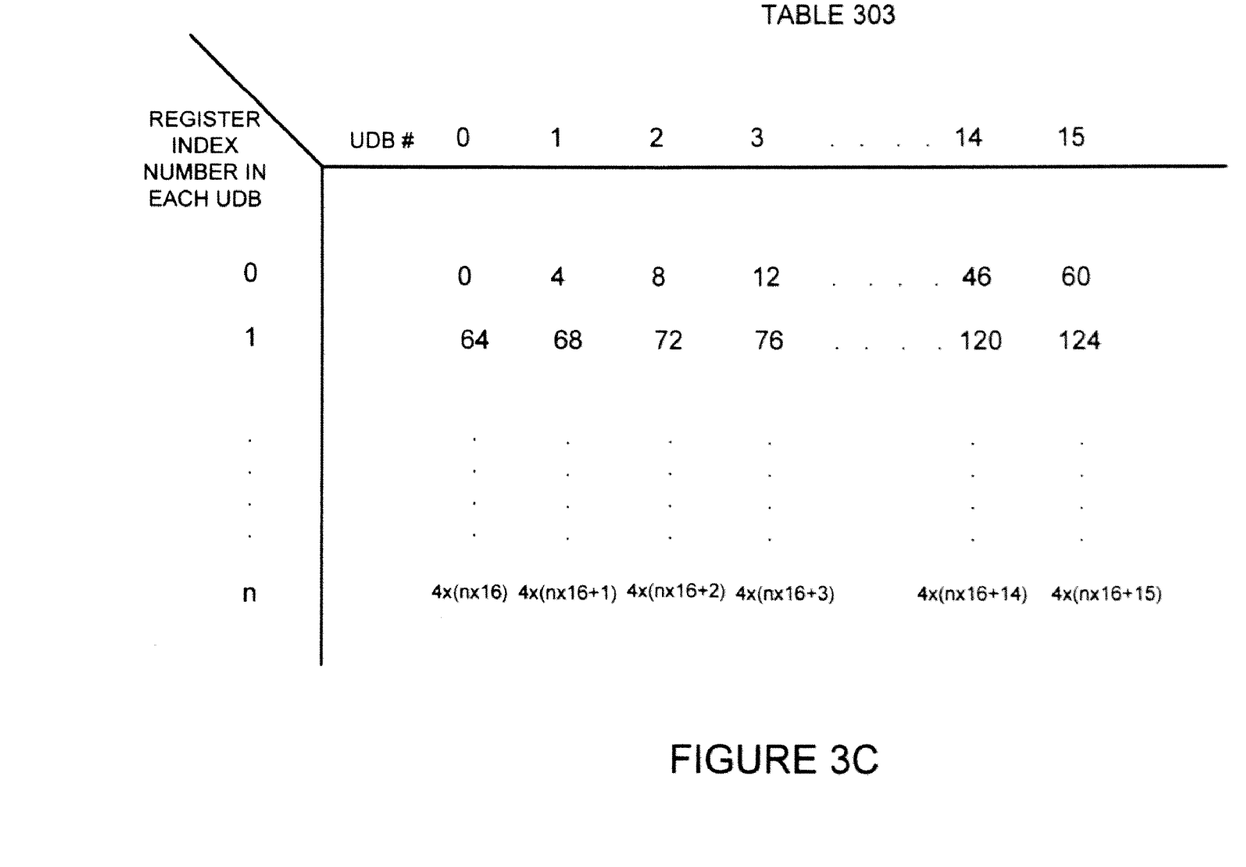
FIG. 3C illustrates a Table 303 showing one embodiment of a memory address space associated with a 32 bits access mode of a digital peripheral function for all registers in each UDB of a UDB linear array.

FIG. 3C illustrates a Table 303 showing one embodiment of a memory address space associated with a 32 bits access mode of a digital peripheral function for all registers in each UDB of a UDB linear array. In this embodiment, the UDB linear array comprises 16 UDBs with each UDB having (n+1) registers A0, A1, . . . An, where 0, 1, . . . n represent the register index numbers in each UDB. Each UDB has an integer UDB number, starting with 0 and ending with 15. The memory addresses in the memory address space comprise R×((register index number×number of UDBs in the UDB linear array)+UDB number), where R is the ratio between the width of the access mode of the digital peripheral function and the width of each UDB in the UDB line array. In one embodiment, each UDB in the UDB linear array is 8 bits wide. According, R=32 bits of access mode/8 bits of UDB width=4. Thus, each memory address in the memory address space in Table 300 C can be calculated by 4×((register index number×number of UDBs in the UDB linear array)+UDB number). For example, the corresponding memory address for the register A0 in UDB 15 is 4×(0×16+15)=60.

As shown above, each register in each UDB is associated with a plurality of memory addresses, where each memory address resides in a memory address space associated with an access mode width of a digital peripheral function. For example, the register A0 in UDB 3 is associated with three memory addresses, i.e., the memory addresses 3, 6, and 12 from the memory address spaces associated with the access modes width of 8, 16, and 32 bits, respectively. Based on an access mode width of the digital peripheral function, a memory address can be chosen from the plurality of associated memory addresses for any register in any UDB in the UDB linear array when the digital processing device 110 accesses the mapped digital peripheral function in the UDB linear array. For example, if the access mode width is 16 bits, the memory address of 6 is chosen for the register A0 in UDB3. Thus, any digital peripheral functions of various access mode widths can be mapped to one or more contiguous UDBs starting with any UDB of the UDB linear array, which makes more efficient use of the available resources and results in atomic register access of any supported register width.

Figure 4:
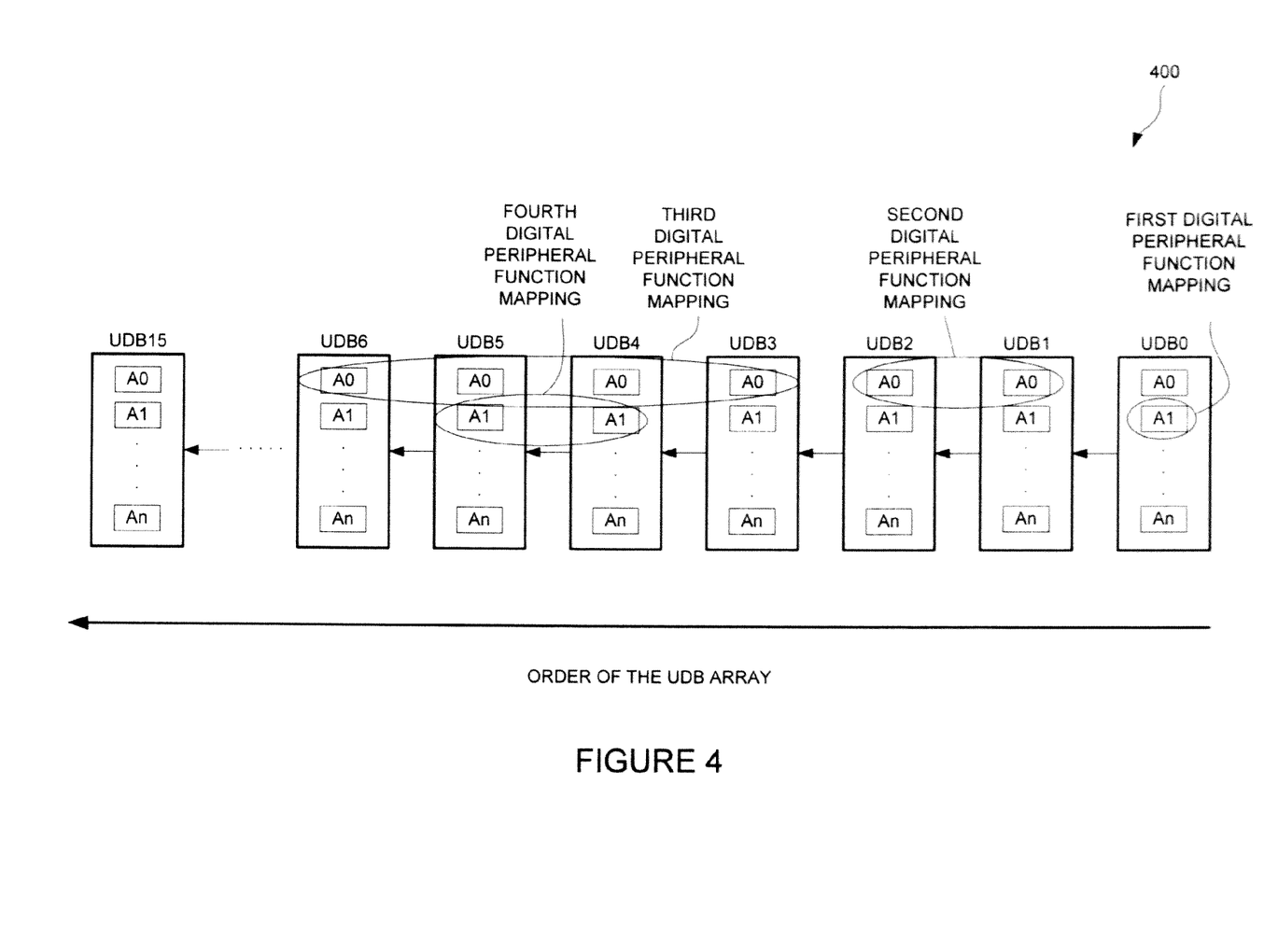
FIG. 4 illustrates one embodiment of a UDB linear array with mapped digital peripheral functions.

FIG. 4 illustrates one embodiment of a UDB linear array with mapped digital peripheral functions. As shown, the UDB linear array 400 comprises 16 UDBs with each UDB having (n+1) registers A0, A1, ... An, where 0, 1, ... n represent the register index numbers in each UDB. Each UDB has an integer UDB number and the order of the UDB linear array starts with UDB0 and ends with UDB15. In this embodiment, three digital peripheral functions of various access mode widths, i.e., the first digital peripheral function of an 8 bits access mode width, the second digital peripheral function of a 16 bits access mode width, and the third digital peripheral function of a 32 bits access mode width, are mapped to the UDB linear array 400. As discussed above, each digital peripheral function may have one or more variables. For the simplicity of illustration, only one mapped variable for each digital peripheral function is shown in FIG. 4.

In one embodiment, each register in each UDB is associated with three memory addresses with each memory address from each of the three memory address spaces shown in Table 301, Table 302, and Table 303, respectively. For example, the register A1 in UDB0 is associated with the address of 16, the address of 32, and the address of 64 from each of the memory address spaces shown in Table 301, Table 302, and Table 303, respectively. In one embodiment, each register in each UDB of the UDB linear array is 8 bits wide.

In one embodiment, a first variable of the first digital function of an 8 bits access mode width is mapped to the register A1 in UDB0. Based on the 8 bits access mode width, the memory address of 16 from Table 301 is chosen for the register A1 in UDB0 and the chosen memory address of 16 is used by the programmable processing device to access the mapped first variable of the first digital peripheral function in the register A1 in UDB0. Using this address scheme, any digital function of 8 bits access mode width can be mapped to any UDB and have aligned access.

In one embodiment, a first variable of the second digital peripheral function of a 16 bits access mode width is mapped to one or more contiguous registers A0 staring with the register A0 in UDB1 based on the linear sequence of the UDB linear array 400. Because of the 16 bits access mode width, the memory address of 2 from Table 302 is chosen for the register A0 in UDB1 and the chosen memory address of 2 is used to access the mapped first variable of the second digital peripheral function starting with the register A0 in UDB1. In one embodiment, the low byte of the 16 bits first variable of the second digital peripheral function is mapped to the register A0 in UDB1 and the high byte of the 16 bits first variable of the second digital peripheral function is mapped to the register A0 in UDB2. The register AD in UDB1 and the register A0 in UDB2 are adjacent to each other and the register A0 in UDB2 is subsequent in order to the register A0 in UDB1 based on the linear order of the UDB linear array. Using this address scheme, any digital function of 16 bits access mode width can be mapped to any contiguous set of 2 UDBs and have aligned access.

In one embodiment, a first variable of the third digital peripheral function of a 32 bits access mode width is mapped to one or more registers A0 starting with the register A0 in UDB3. Based on the 32 bits access mode width, the memory address of 12 is chosen from the memory address space in Table 303 for the register A0 in UDB3. The chosen memory address of 12 is used to access the mapped first variable of the third digital peripheral function starting with the register A0 in UDB3. In one embodiment, the low byte of the 32 bits first variable of the third digital peripheral function is mapped to the register A0 in UDB3, the first medium byte of the 32 bits first variable of the third digital peripheral function is mapped to the register A0 in UDB 4, the second medium byte of the 32 bits first variable of the third digital peripheral function is mapped to the register AU in UDB 5, and the high byte of the 32 bits first variable of the third digital peripheral function is mapped to the register A0 in UDB 6. As shown, the register A0 in UDB3, the register A0 in UDB4, the register A0 in UDB5, and the register A0 in UDB6 are adjacent with each other and are subsequent in order based on the linear order of the UDB linear array. Using this address scheme, any digital function of 32 bits access mode width can be mapped to any contiguous set of 4 UDBs and have aligned access.

In one embodiment, multiple functions can be mapped into the same one or more UDBs. As shown, the third digital peripheral function of a 32 bits access mode width is mapped to UDB3, UDB4, UDB5, and UDB6. Specifically, the third digital peripheral function of a 32 bits access mode with is mapped to the four registers A0 starting with the register A0 in UDB3. The other registers in the UDB3 to UDB6 are available for the mapping of other unrelated functions. In one embodiment, the fourth digital peripheral function of a 16 bits access mode width is mapped to UDB4 and UDB5, which makes use of the two registers A1 in UDB4 and UDB5. In case of shared UDB resources, the programmable processing device will access the mapped digital peripheral functions in the same manner as unshared UDB resources. To access the full 32 hits of the third digital peripheral function, the programmable processing device will read or write starting with the address UDB3 in the 32 bits address space. To access the full 16 bits of the fourth digital peripheral function, the programmable processing device would read or write starting with the address of UDB4 in the 16 bits address space.

Figure 5:
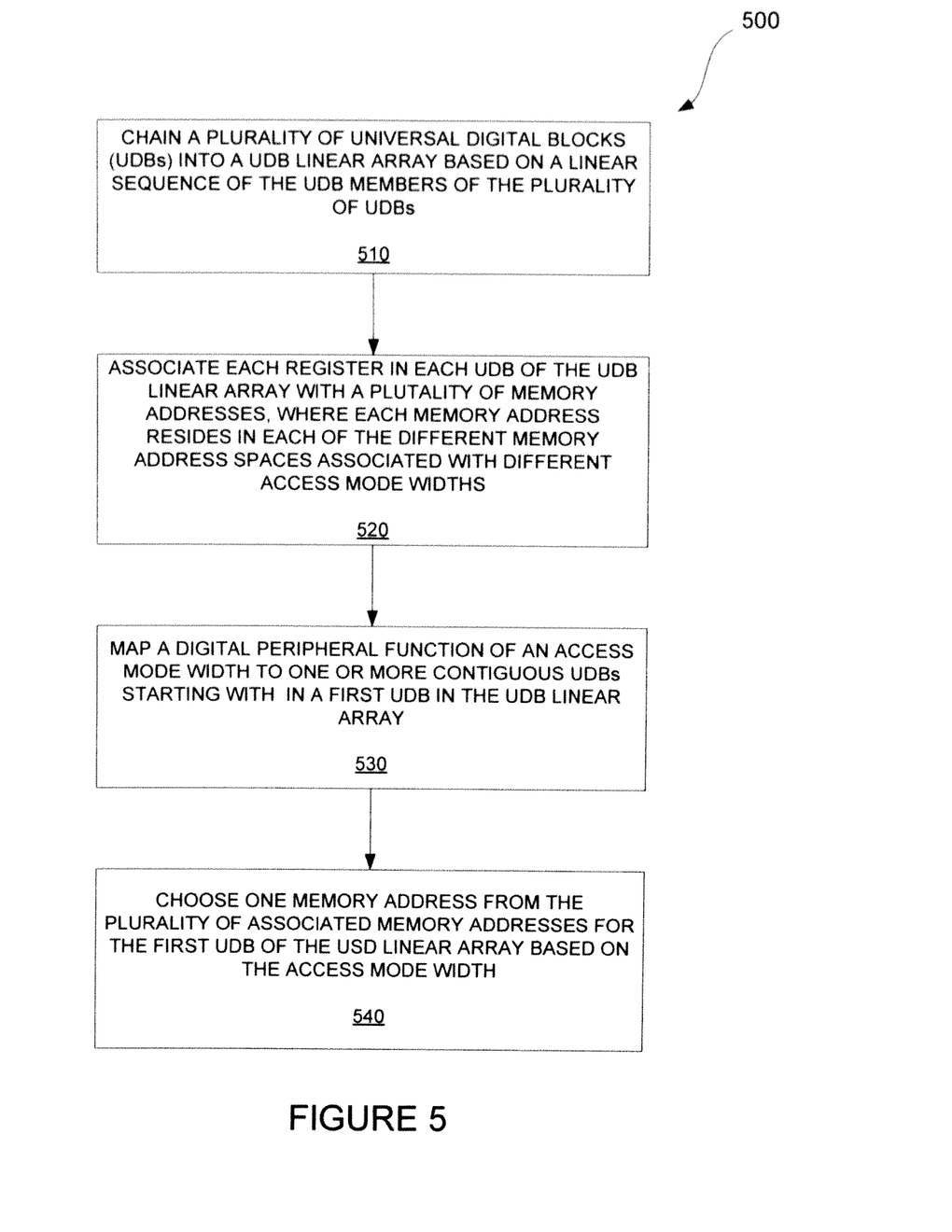
FIG. 5 is a flowchart illustrating one embodiment of a method of a flexible peripheral digital function address mapping scheme in a programmable logic array.

FIG. 5 is a flowchart illustrating one embodiment of a method 500 of a flexible peripheral digital function address mapping scheme in a programmable logic array. The order in which some or all of the process blocks appear in method 500 should not be deemed limiting. Rather, one or ordinary skill in the art having the benefit of the present disclosure will understand that some of the process blocks may be executed in a variety of orders not illustrated.

In one embodiment, the programmable logic array is a UDB linear array in a programmable digital system of a programmable processing device. In one embodiment, each UDB in the UDB linear array comprises same number of a plurality of registers. In one embodiment, each register in each UDB has the same width, for example, 8 bits wide. Each register in each UDB has a register index number.

In block 510, a plurality of UDBs are chained into a UDB linear array based on a line sequence of the UDB numbers of the plurality of UDBs. In one embodiment, each UDB in the UDB linear array has a unique UDB number. In one embodiment, the UDB numbers are integers, such 0, 1, 2, . . . , N. In one embodiment, the linear sequence of the UDB numbers is an ascending sequence.

In block 520, each register in each UDB of the UDB linear array is associated with a plurality of memory addresses, where each of the plurality of memory addresses resides in each of a plurality of memory address spaces associated with different access mode widths of different digital peripheral functions. In one embodiment, the access mode width of a digital peripheral function is 8 bits. In another embodiment, the access mode width of a digital peripheral function is 16 bits. In yet another embodiment, the access mode width of a digital peripheral function is 32 bits. In one embodiment, each of the memory address space is separated from each other in a system memory map.

In one embodiment, the memory address in a memory address space associated with access mode width of a digital peripheral function for a register in a UDB may be calculated by the following formula:

Memory Address=$R \times$((register index number in each UDB$\times$number of UDBs in the UDB linear array)+UDB number).

where R is the ratio between the access mode width of the digital peripheral function and the width of the UDB in the UDB linear array.

In block 530, a digital peripheral function with a given access mode width is mapped to one or more contiguous UDBs starting with a first UDB in the UDB linear array. In one embodiment, the number of one or more contiguous UDBs needed for the mapping may be determined by the ratio R. For example, for a 16 bits access mode and an 8 bits wide UDB, the ratio R=16/8=2. As a result, 2 UDBs are needed for the digital peripheral function mapping: the first UDB and a second UDB, where the second UDB is adjacent to the first UDB in the UDB linear array and is subsequent in order to the first UDB in the UDB linear array. The digital peripheral function has one or more variables. In one embodiment, the first variable of the digital peripheral function is mapped to one or more contiguous registers starting with the first register in the first UDB of the UDB linear array based on the sequence of the UDB linear array. Each of the one or more contiguous registers resides in each of the one or more contiguous UDBs of the UDB linear array.

In block 550, a memory address from a plurality of associated memory addresses is chosen for the first UDB, based on the access mode width. In one embodiment, the chosen memory address for the access mode width is a multiple of the ratio R. In one embodiment, the chosen memory address is used to access the mapped digital peripheral function starting with the first UDB in the register linear array. In one embodiment, a first variable of the digital peripheral function is determined to be accessed by the programmable processing device. The chosen memory address is for the first register in the first UDB of the UDB linear array in order to access the first variable mapped to the one or more contiguous registers starting with the first register in the first UDB.

Figure 6:
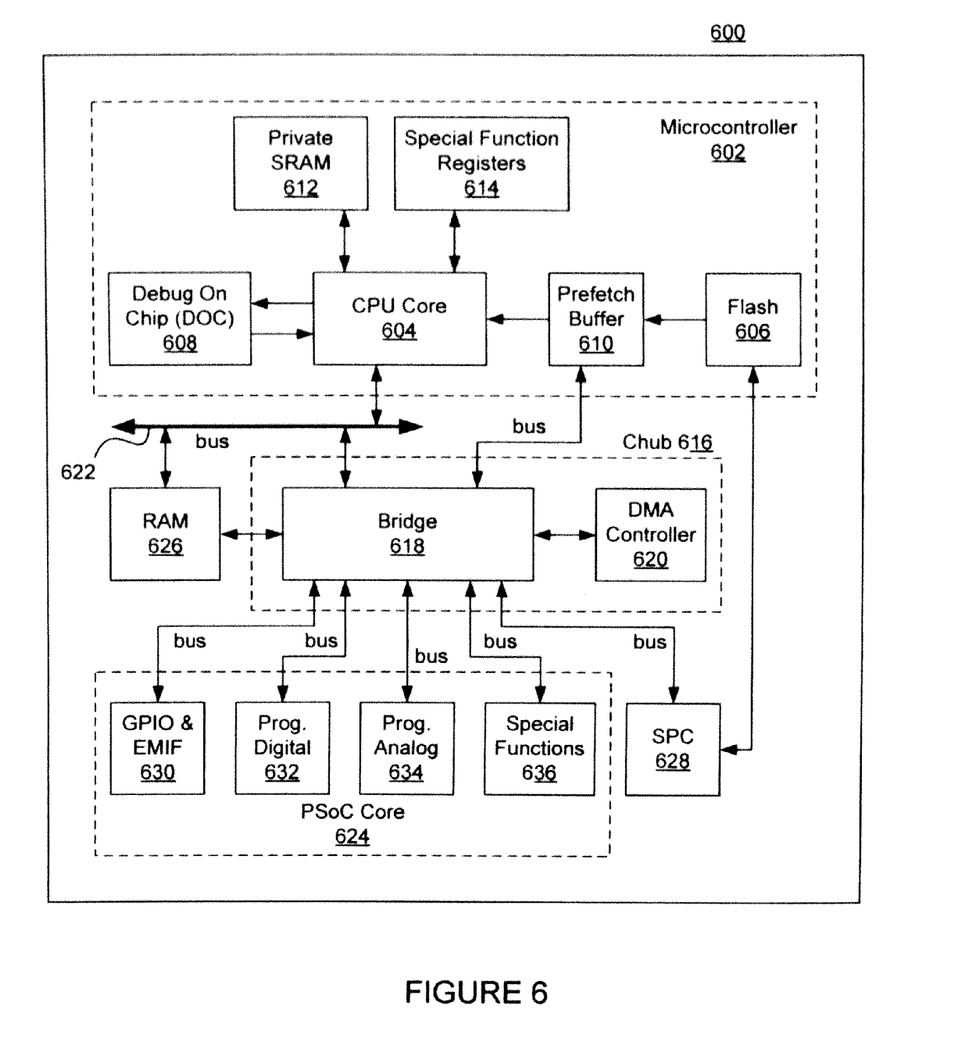
FIG. 6 illustrates an embodiment of a core architecture of a Programmable System-on-Chip (PSoC®), such as that used in the PSoC3® family of products offered by Cypress Semiconductor Corporation (San Jose, Calif.).

FIG. 6 illustrates an embodiment of a core architecture 600 of a Programmable System-on-Chip (PSoC®), such as that used in the PSoC3® family of products offered by Cypress Semiconductor Corporation (San Jose, Calif.). In one embodiment, the core architecture 600 includes a microcontroller 602. The microcontroller 602 includes a CPU (central processing unit) core 604, flash program storage 606, DOC (debug on chip) 608, a prefetch buffer 610, a private SRAM (static random access memory) 612, and special functions registers 614. In an embodiment, the DOC 608, prefetch buffer 610, private SRAM 612, and special function registers 614 are coupled to the CPU core 604, while the flash program storage 606 is coupled to the prefetch buffer 610.

The core architecture 600 may also include a CHub (core hub) 616, including a bridge 618 and a DMA (direct memory access) controller 620, that is coupled to the microcontroller 602 via bus 622. The Chub 616 may provide the primary data and control interface between the microcontroller 602 and its peripherals and memory, and a programmable core 624. The DMA controller 620 may be programmed to transfer data between system elements without burdening the CPU core 604. In various embodiments, each of these subcomponents of the microcontroller 602 and CHub 616 may be different with each choice or type of CPU core 604. The Chub 616 may also be coupled to shared SRAM 626 and an SPC (system performance controller) 628. The private SRAM 612 is independent of the shared SRAM 626 that is accessed by the microcontroller 602 through the bridge 618. The CPU core 604 accesses the private SRAM 612 without going through the bridge 618, thus allowing local register and RAM accesses to occur simultaneously with DMA access to shared SRAM 626. Although labeled here as SRAM, these memory modules may be any suitable type of a wide variety of (volatile or non-volatile) memory or data storage modules in various other embodiments.

In various embodiments, the programmable core 624 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 624 includes a GPIO (general purpose IO) and EMIF (extended memory interface) block 630 to provide a mechanism to extend the external off-chip access of the microcontroller 602, a programmable digital block 632, a programmable analog block 634, and a special functions block 636, each configured to implement one or more of the subcomponent functions. In various embodiments, the special functions block 636 may include dedicated (non-programmable) functional blocks and/or include one or more interfaces to dedicated functional blocks, such as USB, a crystal oscillator drive, JTAG, and the like.

The programmable digital block 632 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 632 may be configured to perform various digital functions, including, but not limited to, one or more of the following functions: a basic I2C slave; an I2C master; a SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level sensitive I/O interrupt generator; a quadrature encoder; a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 604) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× oversampling and supporting a configurable threshold); a LINbus interface; a delta-sigma modulator (e.g., for class D audio DAC having a differential output pa; an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 634 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 634 may support various analog functions including, but not limited to, analog routing, LCD drive IO support, capacitive sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

Embodiments, described herein, include various operations. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable storage medium. These instructions may be used to program a general-purpose or special-purpose processor to perform the described operations. The computer-readable storage medium may include, but is not limited to, magnetic storage medium; optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
mapping, by a programmable process device, a digital peripheral function with an access mode width to one or more contiguous programmable digital blocks (PDBs) starting with a first PDB in a PDB array, each PDB in the PDB array having a unique PDB number and comprising a plurality of registers; and
choosing a memory address from a plurality of associated memory addresses for the first PDB of the PDB array based on the access mode width, each of the plurality of associated memory addresses residing in each of different memory address spaces associated with different access mode widths, wherein the memory address chosen for the first PDB is a multiple of a ratio R between the access mode width of the digital peripheral function and a width of the first PDB.

2. The method of claim 1, further comprising:
associating each register in each PDB of the PDB array with a plurality of memory addresses, wherein each of the plurality of memory address resides in each of the different memory address spaces associated with the different access mode widths, and wherein each register has a register index number.

3. The method of claim 2, wherein each memory address at each different memory address spaces comprises the ratio R×((register index number×number of PDBs in the PDB array)+PDB number).

4. The method of claim 1, further comprising chaining a plurality of PDBs into the PDB array based on a linear sequence of the PDB numbers of the plurality of PDBs.

5. The method of claim 4, wherein the linear sequence of the PDB numbers is an ascending order of the linear sequence of the PDB numbers.

6. The method of claim 1, wherein the different memory address spaces are separated from each other in a memory map.

7. The method of claim 1, further comprising determining a width of the access mode of the digital peripheral function.

8. The method of claim 1, wherein the PDB array is a linear array.

9. The method of claim 1, wherein each register in each PDB of the PDB array has a same width.

10. The method of claim, wherein the mapping the digital peripheral function further comprises:
   mapping a first variable of the digital peripheral function to one or more contiguous registers starting with a first register in the first PDB of the PDB array based on a linear sequence of the PDB array.

11. The method of claim 10, wherein the choosing the memory address further comprises:
   determining to access the first variable of the digital peripheral function; and
   choosing the memory address for the first register in the first PDB of the PDB array based on the access mode width.

12. The method of claim 1, further comprising determining a number of the one or more contiguous PDBs needed for the digital peripheral function mapping based on the ratio R.

13. An apparatus, comprising:
   a plurality of programmable digital blocks (PDBs) in a PDB array, wherein each PDB is associated with an unique PDB number, and each PDB comprises a plurality of registers; and
   a processing device coupled to each of the plurality of PDBs in the PDB array,
   wherein the processing device is configured to map a digital peripheral function with an access mode width to one or more contiguous PDBs starting with a first PDB in the PDB array, and
   wherein the processing device is further configured to choose a memory address from a plurality of associated memory addresses for the first PDB of the PDB array based on the access mode width, each of the plurality of associated memory addresses residing in each of different memory address spaces associated with different access mode widths, wherein the memory address chosen for the first PDB is a multiple of a ratio R between the access mode width of the digital peripheral function and a width of the first PDB.

14. The apparatus of claim 13, wherein the processing device is further configured to chain the plurality of PDBs into the PDB array based on a linear sequence of the PDB numbers.

15. The apparatus of claim 13, wherein the processing device is further configured to associate a plurality of memory addresses to each register in each PDB of the PDB array, wherein each of the plurality of memory addresses resides in each of the different memory address spaces associated with the different access mode widths.

16. The apparatus of claim 13, further comprising:
   an interface logic coupled to each PDB in the PDB array and the processing device, wherein the interface logic is configured to determine a width of the access mode of the digital peripheral function.

17. The apparatus of claim 13, wherein the PDB array is a linear array.

18. A computer readable storage medium including instructions that, when executed by a computer system, cause the computing system to perform a method comprising:
   mapping, by a programmable process device, a digital peripheral function with an access mode width to one or more contiguous programmable digital blocks (PDBs) starting with a first PDB in a PDB array, each PDB in the PDB array having a unique PDB number and comprising a plurality of registers; and
   choosing a memory address from a plurality of associated memory addresses for the first PDB of the PDB array based on the access mode width, each of the plurality of associated memory addresses residing in each of different memory address spaces associated with different access mode widths, wherein the memory address chosen for the first PDB is a multiple of a ratio R between the access mode width of the digital peripheral function and a width of the first PDB.

19. The computer readable storage medium of claim 18, further comprising associating each register in each PDB of the PDB array with a plurality of memory addresses, wherein each of the plurality of memory address resides in each of the different memory address spaces associated with the different access mode widths.

20. The computer readable storage medium of claim 18, wherein the mapping the digital peripheral function further comprises:
   mapping a first variable of the digital peripheral function to one or more contiguous registers starting with a first register in the first PDB of the PDB array based on a linear sequence of the PDB array.

* * * * *